(12) United States Patent
Wu

(10) Patent No.: US 8,403,556 B2
(45) Date of Patent: Mar. 26, 2013

(54) BLENDER LID SAFETY PROTECTION DEVICE

(75) Inventor: Andy Wu, Fujian (CN)

(73) Assignee: Quanzhou Yida Home Appliance Industry Co., Ltd., Fujian (CN)

( * ) Notice: Subject to any disclaimer, the term of this patent is extended or adjusted under 35 U.S.C. 154(b) by 209 days.

(21) Appl. No.: 13/024,421

(22) Filed: Feb. 10, 2011

(65) Prior Publication Data

US 2012/0206995 A1    Aug. 16, 2012

(51) Int. Cl.
*A47J 43/07* (2006.01)
*A47J 43/046* (2006.01)

(52) U.S. Cl. ........................... 366/206; 241/37.5

(58) Field of Classification Search .......... 366/205, 366/206, 314, 601; 99/348; 241/37.5
See application file for complete search history.

(56) References Cited

U.S. PATENT DOCUMENTS

| | | | | |
|---|---|---|---|---|
| 5,567,049 | A * | 10/1996 | Beaudet et al. | 366/206 |
| 6,513,966 | B1 * | 2/2003 | Gort-Barten et al. | 366/205 |
| 6,540,394 | B2 * | 4/2003 | Juriga | 366/205 |
| 6,554,466 | B1 * | 4/2003 | Lee | 366/206 |
| 6,629,492 | B1 * | 10/2003 | Li | 99/337 |
| 6,637,681 | B1 * | 10/2003 | Planca et al. | 241/37.5 |
| 6,910,800 | B2 * | 6/2005 | Wu | 366/199 |
| 7,407,320 | B1 * | 8/2008 | Lin | 366/206 |
| 7,871,196 | B2 * | 1/2011 | Lin | 366/206 |
| 2002/0071340 | A1 * | 6/2002 | Juriga | 366/205 |
| 2004/0042338 | A1 * | 3/2004 | Wu | 366/205 |
| 2009/0045272 | A1 * | 2/2009 | Lin | 241/37.5 |
| 2012/0206995 | A1 * | 8/2012 | Wu | 366/205 |

FOREIGN PATENT DOCUMENTS

FR    2865623 A1 *    8/2005

* cited by examiner

*Primary Examiner* — Charles E Cooley
(74) *Attorney, Agent, or Firm* — Alan Kamrath; Kamrath IP Lawfirm, P.A.

(57) ABSTRACT

A blender lid safety protection device includes a latch cover mechanism installed outside a mixing cup, such that after a lid is covered vertically onto the mixing cup, the lid is latched and fixed to the latch cover mechanism. A link rod has a compression spring coupled to the bottom of the link rod for propping the bottom of the link rod to a certain distance from one of the control switches of a power circuit control switch. After the blender lid is pressed down, the top end of the link rod drives the compression spring at the bottom of the link rod to move downward to trigger a control switch. Only after the blender lid is covered onto the mixing cup, the control switch of one of the power circuit switches will be electrically conducted, to provide a safety protection.

4 Claims, 10 Drawing Sheets

BLENDER LID SAFETY PROTECTION DEVICE

BACKGROUND OF THE INVENTION

1. Field of the Invention

The present invention relates to a blender lid safety protection device and, more particularly, to a blender lid safety protection device capable of electrically conducting a control switch of one of the power circuits of a blender only if a blender lid is vertically covered onto a mixing cup to a correct position, to achieve the safety protection effect and to facilitate users to cover the blender.

2. Description of the Related Art

As a conventional blender generally includes a base with a motor, a mixing cup disposed on the base, and a blender lid covered onto the mixing cup. A knife is installed at the bottom of an internal side of the mixing cup of the blender and driven and rotated by a motor. Thus, after a user puts a food material into the mixing cup and then presses a switch installed on the base, the knife installed in the mixing cup can cut and/or crush the food material. To prevent a possible risk of cutting the user's fingers when the user opens the blender lid and puts his/her hand into the operating blender, conventional advanced blenders usually come with a safety protection device that will disconnect a power circuit immediately if the blender lid is not secured to a fixed position or the blender lid is opened. In the aforementioned safety protection method, the conventional blender lid and the mixing cup are generally secured by rotating the lid and securing the mixing cup. Obviously, the operation of securing the blender lid by rotating the lid is quite inconvenient. In view of such drawback, the present invention provides a blender lid safety protection device to overcome the drawback of the prior art.

SUMMARY OF THE INVENTION

Therefore, it is a primary objective of the present invention to provide a blender lid safety protection device capable of electrically conducting a control switch of one of the power circuits only if the blender lid is vertically covered onto a mixing cup and secured and fixed onto the mixing cup properly, to prevent a knife installed in the mixing cup from cutting a user's hand when the user extends his/her hand into the mixing cup of a blender accidentally.

To achieve the foregoing objective, the present invention provides a blender lid safety protection device including a latch cover mechanism installed outside a mixing cup. After the blender lid is vertically covered onto the mixing cup, the blender lid is latched and fixed by the latch cover mechanism. A link rod has a spring passed and installed to the bottom end of the link rod for supporting and keeping the link rod with a certain distance from the control switch of one of the power circuits. After the blender lid is covered onto the mixing cup, the top end of the link rod is pressed downwardly by the blender lid, and the compression spring at the bottom of the link rod is moved downward to trigger the control switch. Therefore, the control switch of one of the power circuits is electrically conducted only if the blender lid is covered onto the mixing cup properly, to provide a safety protection effect.

DETAILED DESCRIPTION OF THE PREFERRED EMBODIMENTS

To make it easier to understand the technical characteristics and measures of the present invention to achieve the aforementioned objectives and effects, preferred embodiments are used with related drawings for the detailed description of the present invention as follows.

Figure 1:
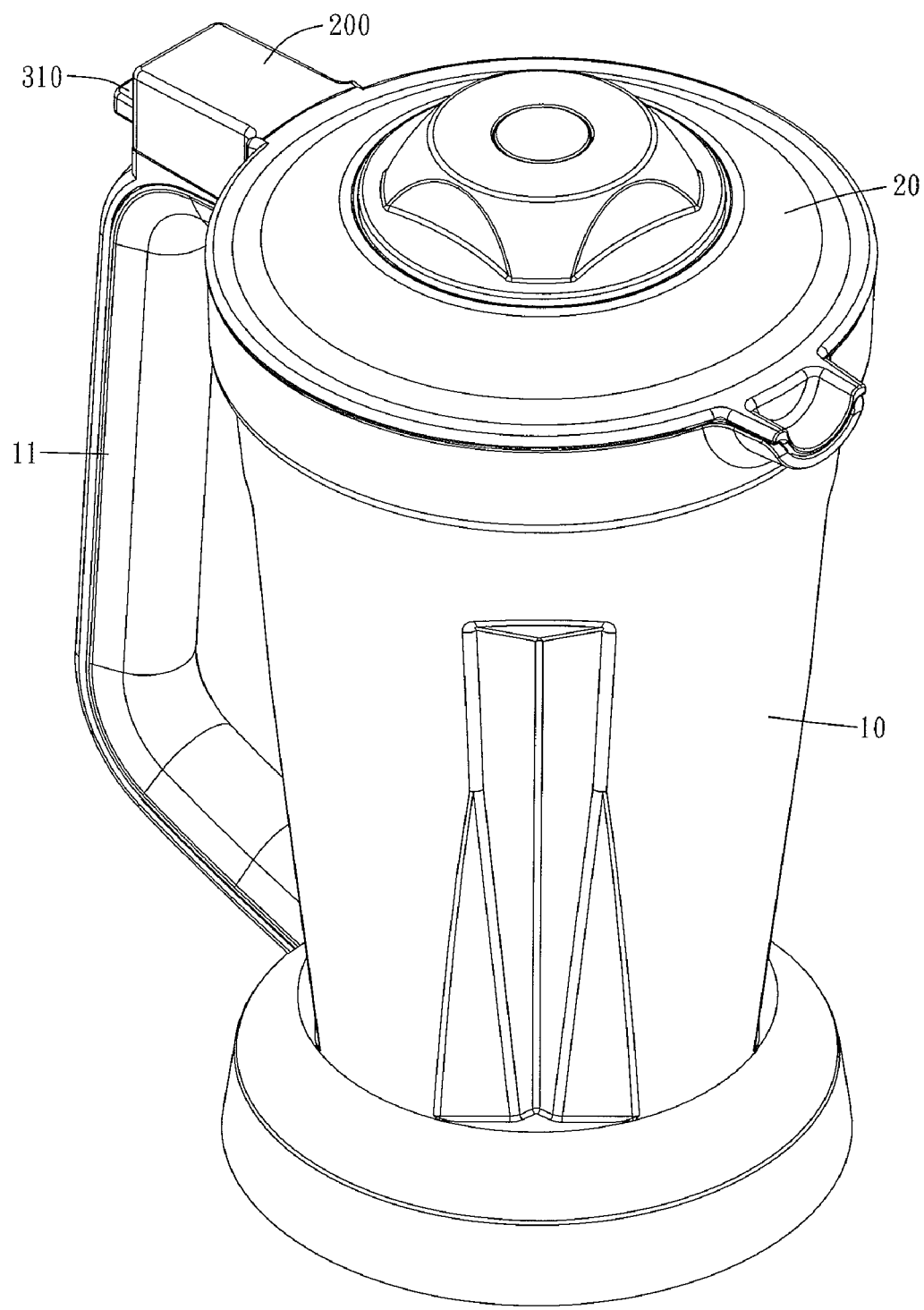
FIG. 1 is a perspective view of a mixing cup and a blender lid in accordance with a preferred embodiment of the present invention.
Figure 2:
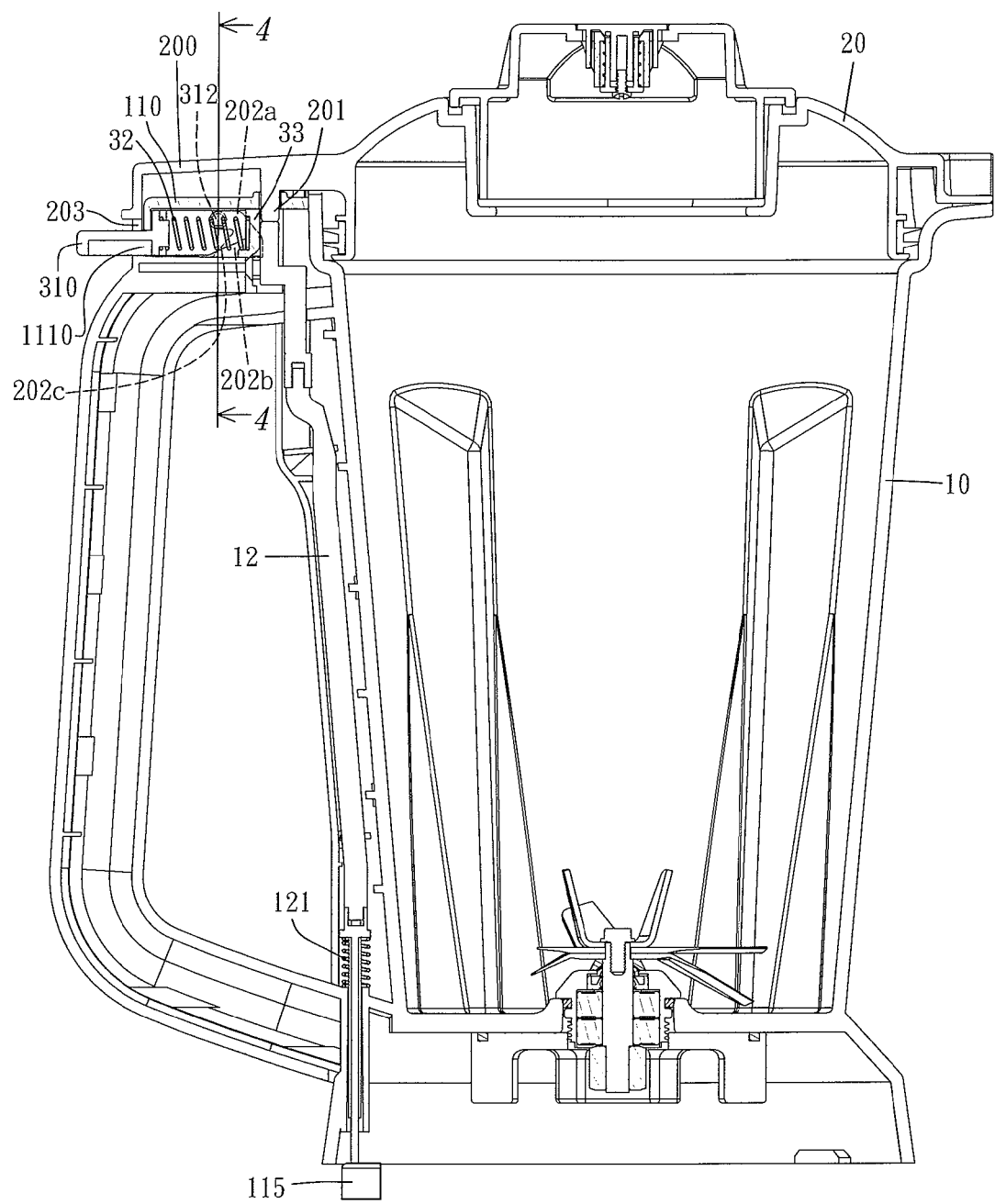
FIG. 2 is a cross-sectional view of a blender lid covered onto a mixing cup in accordance with a preferred embodiment of the present invention.
Figure 3:
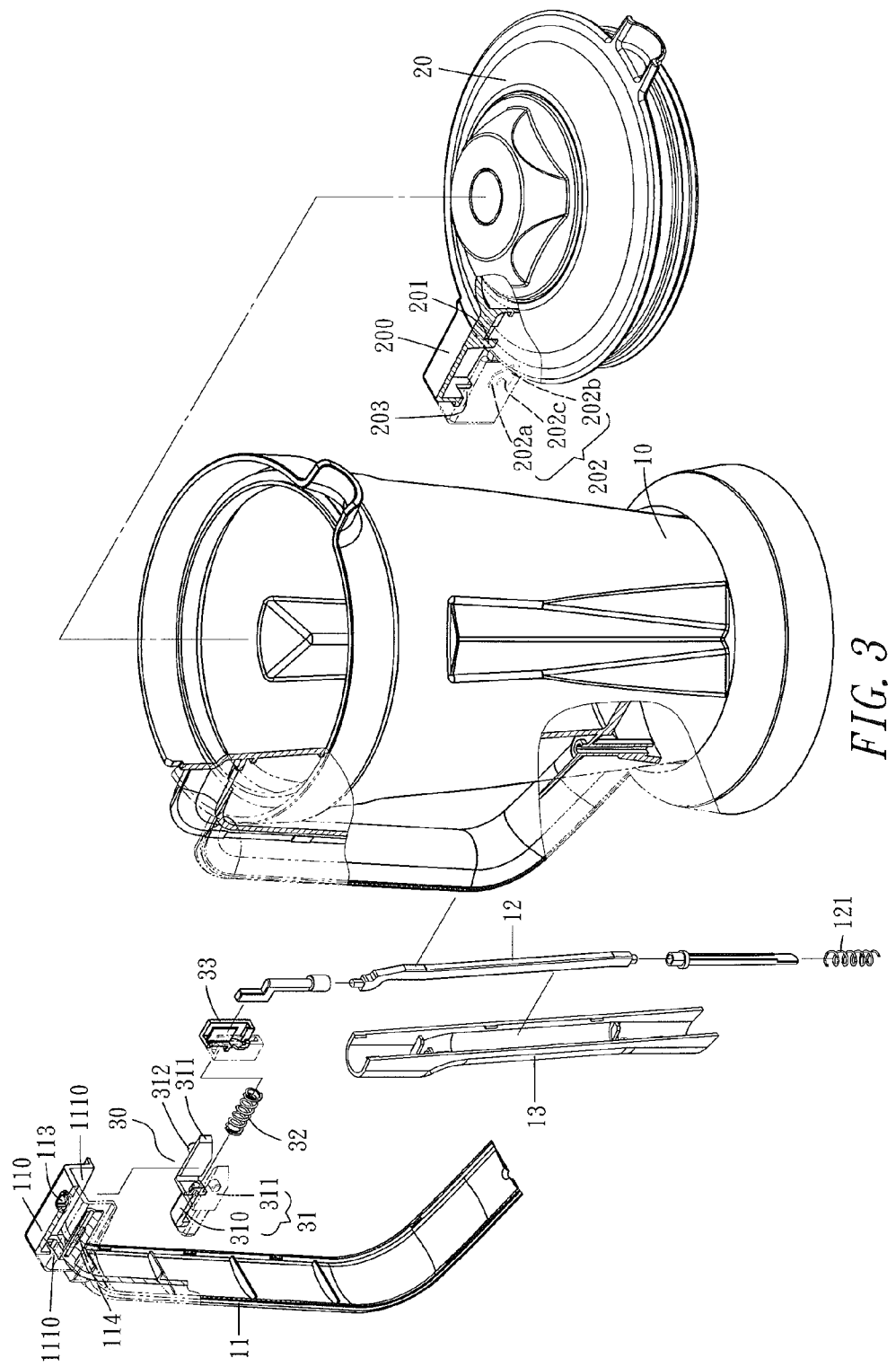
FIG. 3 is an exploded view of a mixing cup and a blender lid in accordance with a preferred embodiment of the present invention.

With reference to FIGS. 1 to 3 for a blender lid safety protection device in accordance with the present invention, the blender safety protection device comprises the following three major parts including a base of an electric blender, a mixing cup and a blender lid.

Figure 4:
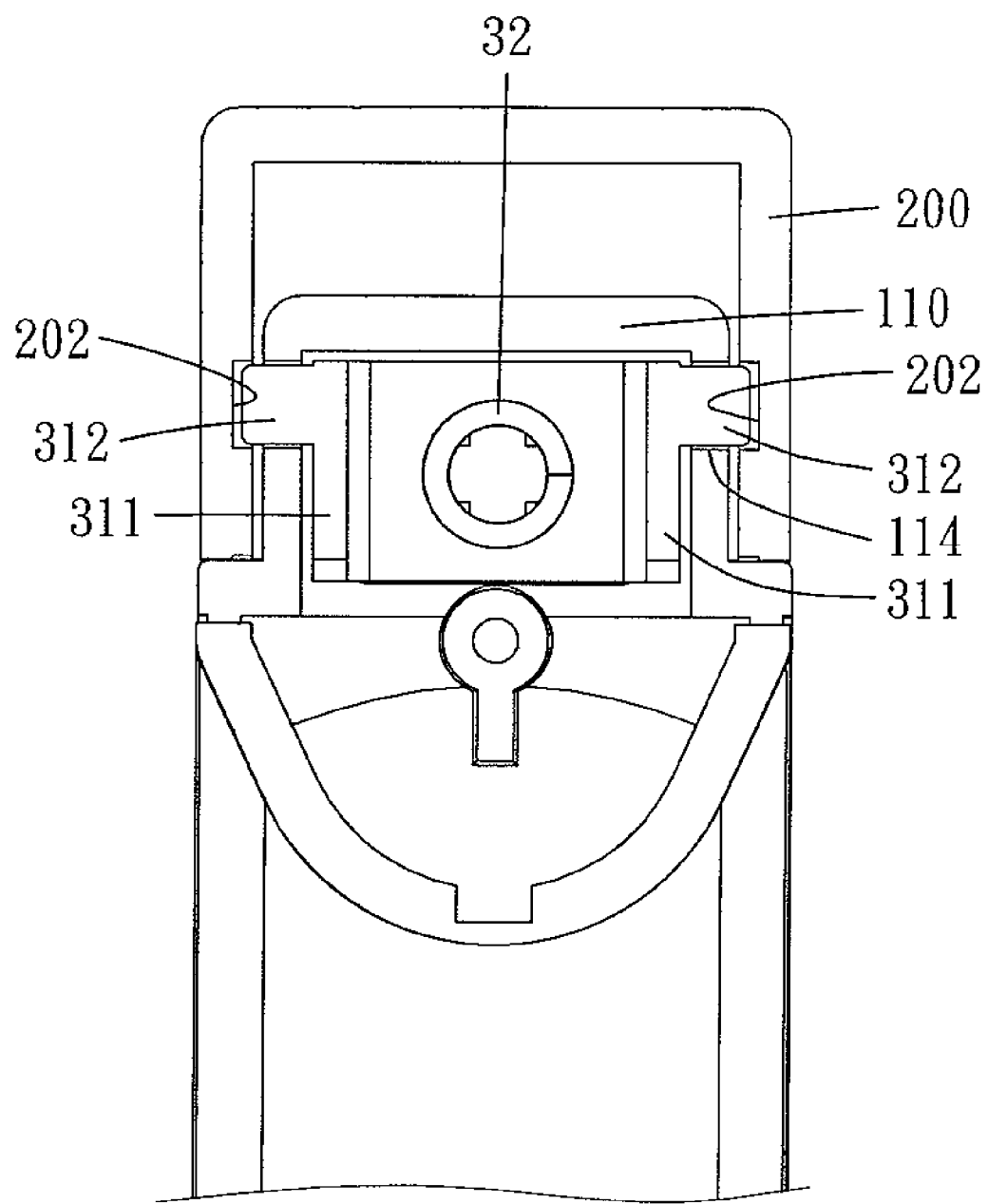
FIG. 4 is a cross-sectional view of Section 4-4 of FIG. 2.
Figure 6:
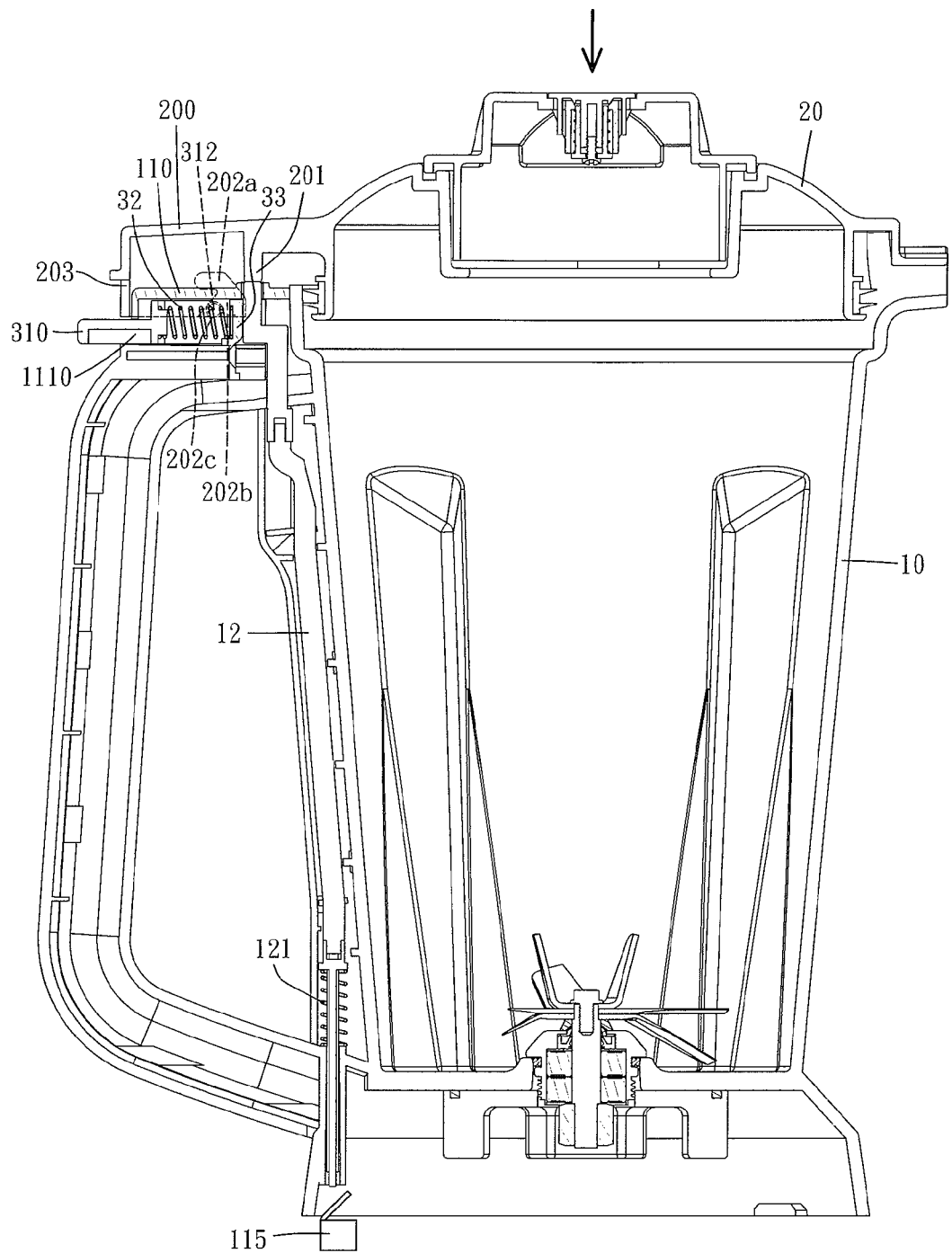
FIGS. 6 and 7 are schematic views of combining a blender lid and a mixing cup in accordance with a preferred embodiment of the present invention.

The mixing cup 10 (as shown in FIG. 3) comprises: a handle 11 coupled to an external side of the mixing cup 10; a hollow female embedding base 110 formed in a space at the top of the handle 11 and having a notch 1110 formed separately at front and rear ends of female embedding base 110; a link rod 12 (as shown in FIG. 2) extended downwardly along the external wall of the mixing cup 10 and having the top end passed through the handle 11 and extended into the female embedding base 110 and the bottom end passed into the external edge of the bottom of the mixing cup 10 and extended into the bottom of the mixing cup 10; a protective cover 13 (as shown in FIGS. 2 and 3) installed onto the exterior of the mixing cup 10 to cover the link rod 12 between the protective cover 13 and the mixing cup 10 to restrict the link rod 12 to be displaced linearly up and down only; and a control switch 115 (as shown in FIGS. 2 and 6) of one of the power circuits installed at the bottom of the mixing cup 10 and with a predetermined distance from the bottom end of the link rod 12. The female embedding base 110 has a through hole 113 formed at the top surface corresponding to the top end of the link rod 12 and a transverse slot 114 (as shown in FIG. 4) penetrated through the middle of two sidewalls. A link rod 12 has a spring 121 passed and installed to the bottom of the link rod 12, with the spring 121 having an elastic force to push and maintain the link rod 12 upward, such that the bottom end of the link rod 12 is maintained at a position with a certain distance from the control switch 115 below.

Figure 5:
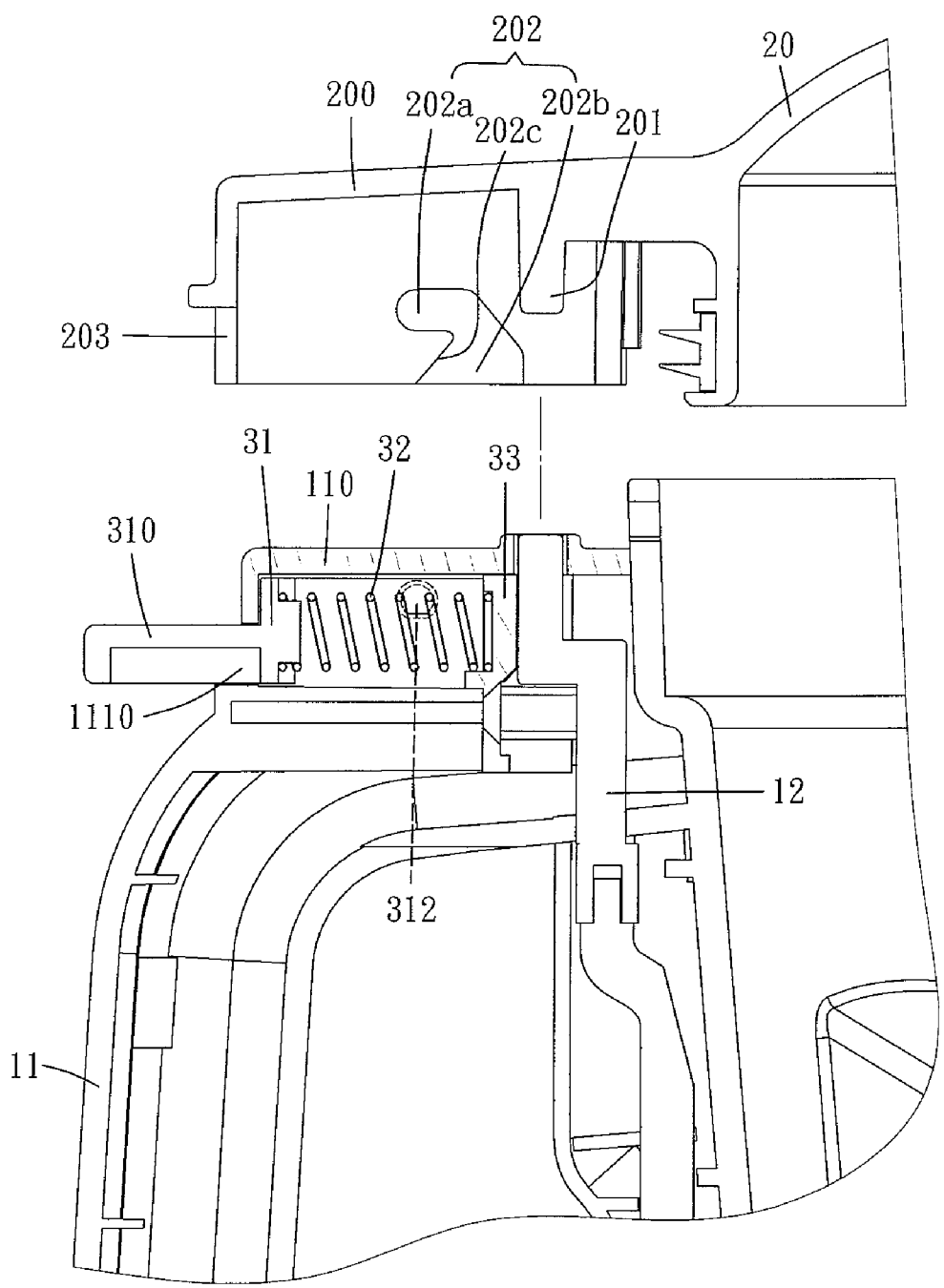
FIG. 5 is a cross-sectional exploded view of a blender lid and a mixing cup in accordance with a preferred embodiment of the present invention.

The blender lid 20 (as shown in FIGS. 2 and 3) is installed at the top of the mixing cup 10, and the blender lid 20 includes a male embedding base 200 protruded from the blender lid 20 and corresponding to a side of the female embedding base 110. The male embedding base 200 can be embedded into an external side of the female embedding base 110. The male embedding base 200 includes a pushing plate 201 extended downwardly from an internal ceiling corresponding to the top end of the link rod 12 and at a position of the through hole 113 on the top surface of the female embedding base 110. The male embedding base 200 corresponding to the notch 1110 and formed at an end of an external side of the female embedding base 110 has an opening 203 corresponding to the external sidewall. An inwardly concave guide rail 202 (as shown in FIG. 5) is installed separately on both corresponding internal walls of the male embedding base 200 and is perpendicular to the opening 203. The guide rail 202 has a horizontal section 202a and a vertical section 202b coupled to the horizontal section 202a. The vertical section 202b is disposed closer to the mixing cup 10, and the vertical section 202b is disposed closer to the internal wall of an end of the push handle 310 to define a tapered internal wall 202c with an expanded opening at the bottom.

In FIGS. 3 and 5, a latch cover mechanism 30 is embedded into the female embedding base 110 at the top end of the handle 11 and provided for latching and fixing the blender lid 20 after the blender lid 20 is covered onto the mixing cup 10. The latch cover mechanism 30 comprises a latch base 31 that can be driven and displaced transversally, and a spring 32 for pushing the latch base 31 to move outward. The latch base 31 has a push handle 310 installed at the end of the notch 1110 on an external side of the female embedding base 110 and two parallel side wings 311 extended towards the mixing cup 10. After a latch pellet 312 protruded separately from both side wings 311 and disposed opposite to the horizontal section 202a of the guide rail 202 of the blender lid 20 and the transverse slot 114 of the female embedding base 110 is passed through the transverse slot 114 of the female embedding base 110, a distal portion of the latch pellet 312 is embedded into the horizontal section 202a of the guide rail 202 of the blender lid 20, such that the latch base 31 can be disposed in the female embedding base 110 (as shown in FIG. 4). The spring 32 has an elastic force of pushing the latch base 31, such that the push handle 310 can be pushed and passed through the notch 1110 of the female embedding base 110 and the opening 203 of the male embedding base 200, and extended out from the male embedding base 200. The latch cover mechanism further comprises a fixing base 33 fixed into the female embedding base 110 of the handle 11, a longitudinal through slot formed at an end of the latch cover mechanism for passing the top end of the link rod 12 to restrict the link rod 12 to be displaced linearly and longitudinally only. The other end of the link rod 12 is pushed by the spring 32, such that the other end of the spring 32 can push the latch base 31 to displace towards the notch 1110 of the female embedding base 110.

Figure 7:
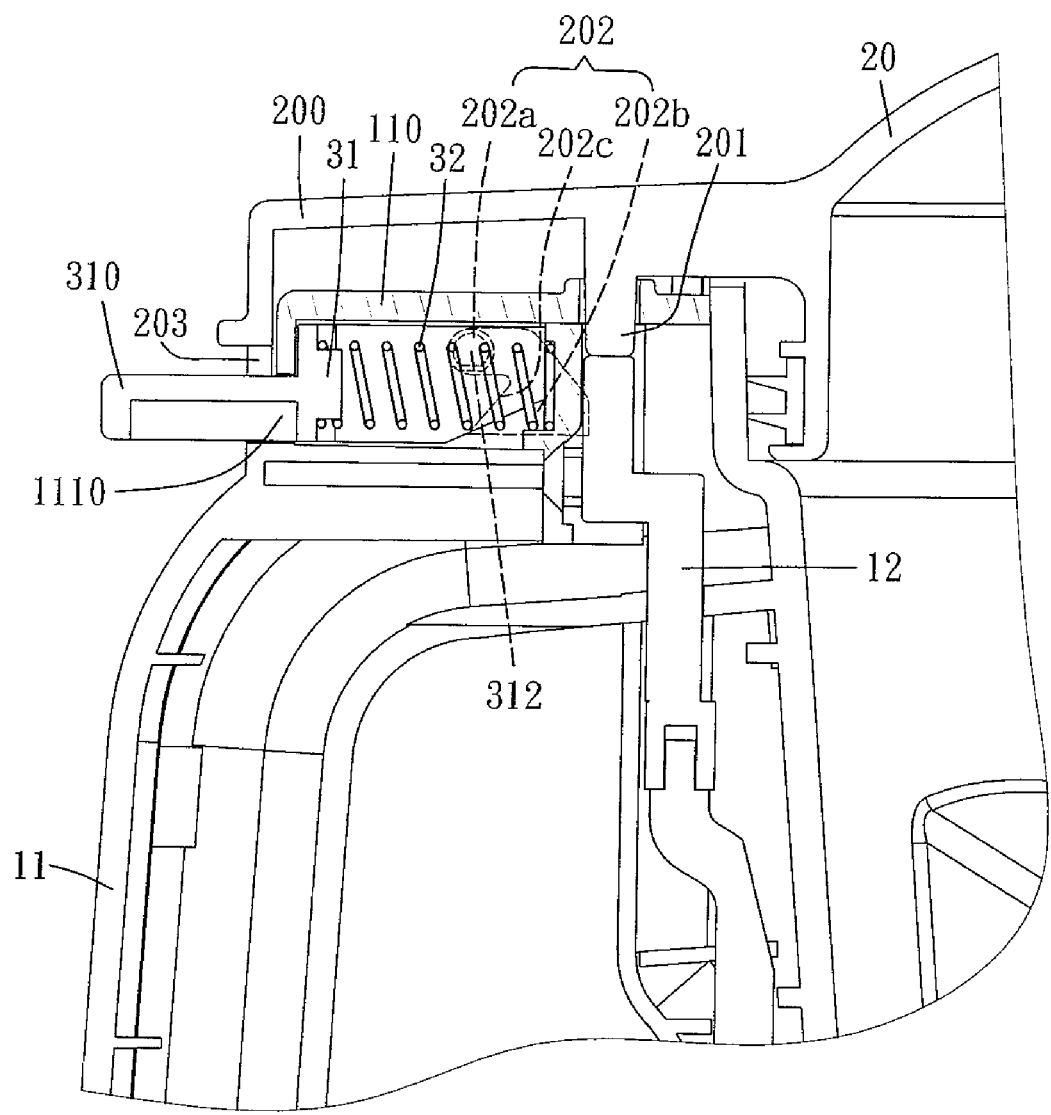
Figure 8:
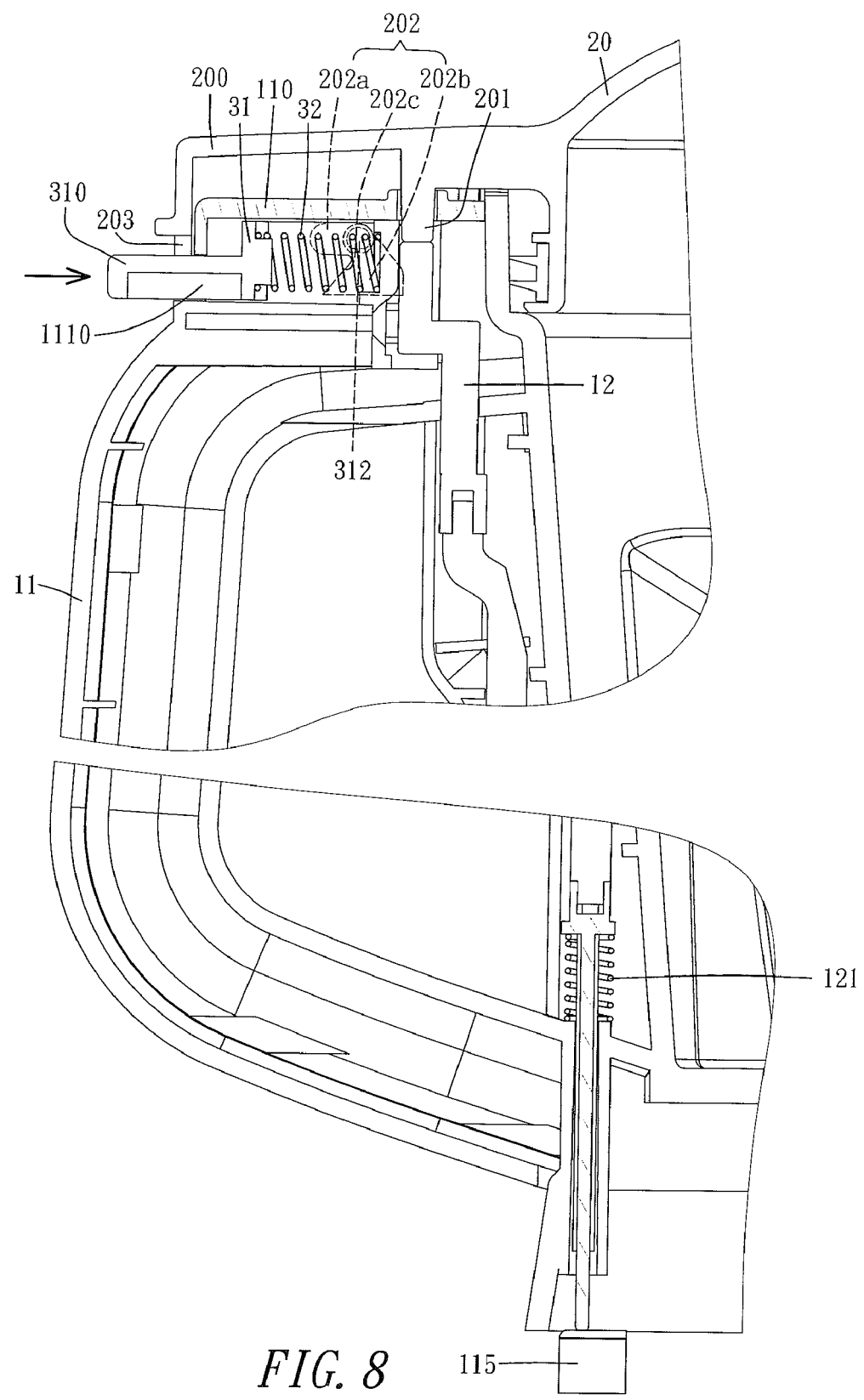
FIGS. 8 to 10 are schematic views of detaching a blender lid from a mixing cup in accordance with a preferred embodiment of the present invention.

If it is necessary to cover the blender lid 20 onto the mixing cup 10 as shown in FIGS. 5 to 7, after the blender lid 20 is covered onto the mixing cup 10, the male embedding base 200 of the blender lid 20 is coupled internally and externally to the female embedding base 110 of the mixing cup 10. Now, the pushing plate 201 installed in the male embedding base 200 of the blender lid 20 is passed into the through hole 113 of the female embedding base 110 of the handle 11, and the link rod 12 is pressed down correspondingly, so that the spring 121 compressed at the bottom of the link rod 12 triggers a control switch 115 of one of the power circuits to electrically conduct the control switch 115 (as shown in FIG. 8). In the meantime, a bottom opening at the vertical section 202b of the guide rail 202 of the male embedding base 200 of the blender lid 20 is provided for embedding the latch pellet 312 of the latch cover mechanism 30. During the process of pressing the blender lid 20 down and covering the blender lid 20 onto the mixing cup 10, the latch pellet 312 of the latch base 31 will be guided and shifted along the tapered internal wall 202c of the vertical section 202b of the guide rail 202 (as shown in FIG. 6), such that the latch base 31 will compress the spring 32, until the latch pellet 312 is moved to the horizontal section 202a. Now, the blender lid 20 is covered completely onto the mixing cup 10, and the latch base 31 will resume its original position by the resilience of the spring 32 as shown in FIG. 7, and the latch pellet 312 of the latch base 31 is disposed at the horizontal section 202a of the guide rail 202 of the blender lid 20 and at a position which is not corresponding to the vertical section 202b, to latch the blender lid 20 and prevent the blender lid 20 from being lifted open freely. After the blender lid 20 is covered onto the mixing cup 10, the blender lid 20 is latched and positioned by the latch cover mechanism 30, and the link rod 12 will trigger a control switch 115 of one of the power circuits to electrically conduct the control switch 115.

Figure 9:
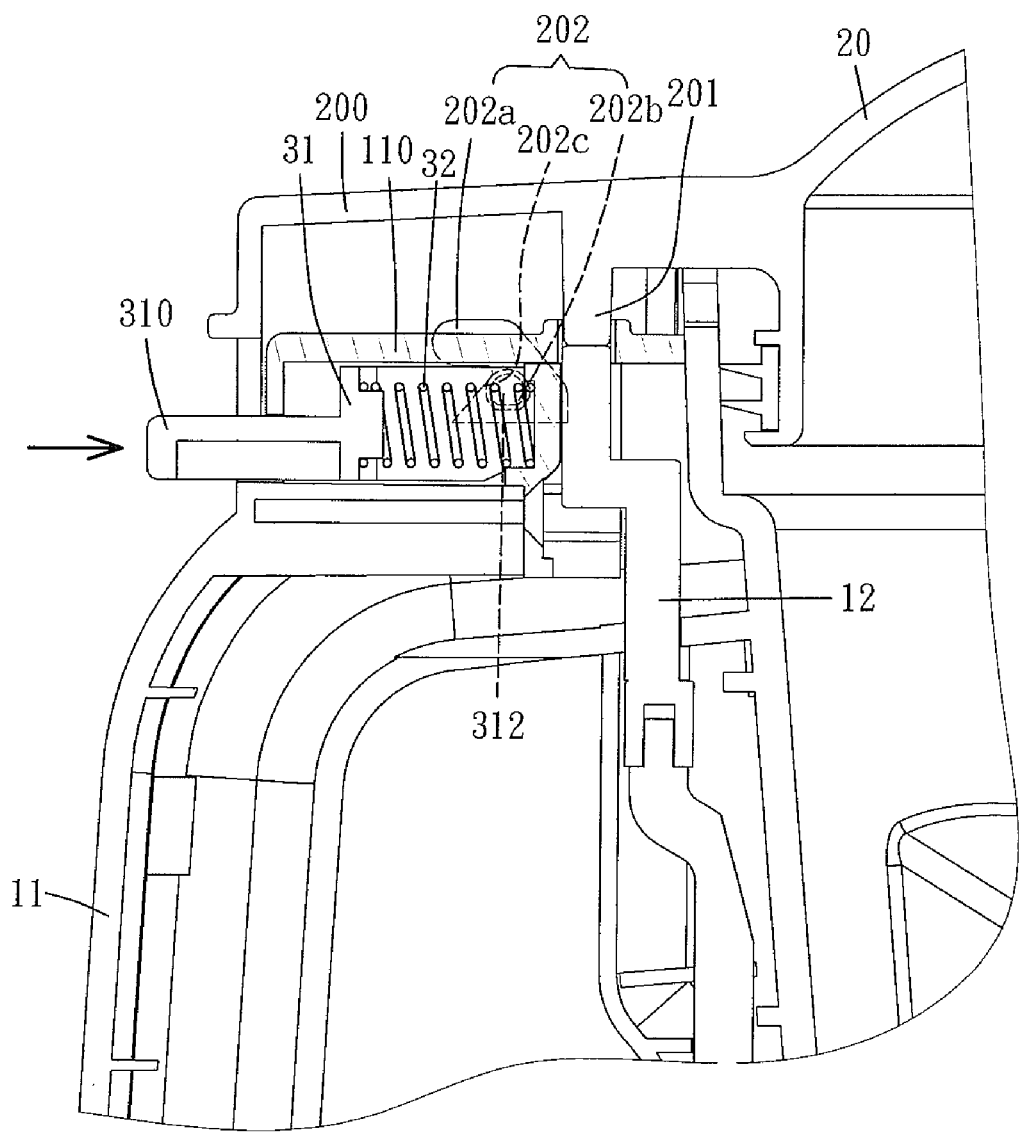
Figure 10:
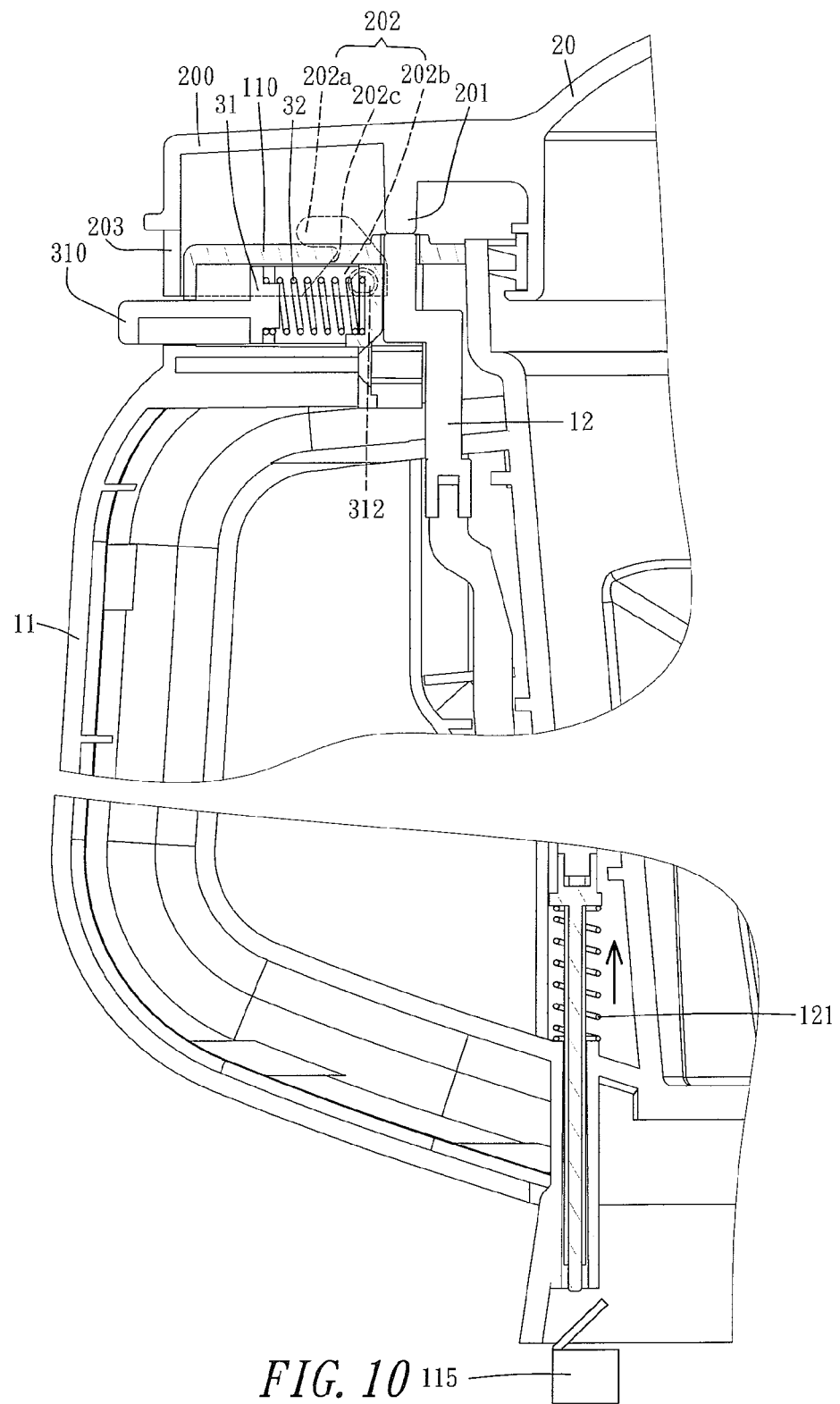

If it is necessary to lift open the blender lid 20 (as shown in FIGS. 8 to 10), the push handle 310 of the latch cover mechanism 30 is pushed inward, such that a side of the latch base 31 compresses the spring 32. When the latch pellet 312 is moved to an intersection of the horizontal section 202a and the vertical section 202b of the guide rail 202, the link rod 12 pressed downward by the spring 121 resumes its original position and pushes the link rod 12 and the blender lid 20 upward to align the vertical section 202b of the guide rail 202 of the blender lid 20 with the latch pellet 312 evenly. Now, the blender lid 20 can be removed. In the meantime, the link rod 12 moves upward but does not trigger the control switch 115 anymore, and, thus, the power circuit can be disconnected (as shown in FIG. 10). As a result, the power circuit will be disconnected immediately to achieve the safety protection effect if the blender lid 20 is detached from a correct covering position of the mixing cup 10.

In summation of the description above, the present invention as disclosed in the preferred embodiments are novel, and it achieves the expected objectives and effects.

What is claimed is:

1. A blender lid safety protection device comprising:
a female embedding base with a hollow interior formed in a space on an external side of a mixing cup of a blender, with a notch formed at a rear end of the female embedding base, with a control switch installed at a bottom of the mixing cup;
a link rod downwardly extended along an external wall of the mixing cup, with the link rod having a top end extended into the female embedding base and a bottom end extended into the bottom of the mixing cup, with the control switch installed with a predetermined distance from the bottom end of the link rod, with the female embedding base having a through hole formed at a top of the female embedding base and corresponding to the top end of the link rod, with a transverse slot penetrated and passed between the corresponding sidewalls of the through hole;
a spring passed and installed to the link rod and providing an elastic force for pushing and maintaining the link rod upward, with the bottom end of the link rod maintained at a position with the predetermined distance from the control switch below;
a blender lid covered onto a top of the mixing cup and having a male embedding base outwardly extended from a corresponding side of the female embedding base and embedded and coupled to an external side of the female embedding base, with a pushing plate downwardly extended from an internal ceiling of the male embedding base and corresponding to the top end of the link rod and a position at the through hole on the top of the female embedding base, with the male embedding base corresponding to the notch at the rear end of the female embedding base, with an opening formed on an external sidewall of the blender lid, with inwardly concave guide rails installed on corresponding internal walls of the male embedding base corresponding to the transverse slot of the female embedding base respectively, with the guide rail having a horizontal section and a vertical section interconnected to the horizontal section, and with the vertical section disposed closer to the mixing cup than the horizontal section; and a latch cover mechanism embedded into the female embedding base and having a latch base driven and displaced transversally, with a spring moving the latch base outward, with the latch base having a push handle installed at an end of the notch corresponding to the rear end of the female embedding base, with an end of the push handle extended out through the notch, with the latch base having two parallel side wings extended and protruded towards an end of the mixing cup, and with a latch pellet protruded separately from the two parallel side wings and aligned towards ends of the transverse slot of the female embedding base respectively, wherein after the latch pellet is passed through the transverse slot of the female embedding base, a distal portion is embedded into the guide rail of the male embedding base of the blender lid to install the latch base in the female embedding base.

2. The blender lid safety protection device of claim 1, wherein the female embedding base is disposed at a top end of a handle of the mixing cup.

3. The blender lid safety protection device of claim 1, wherein the vertical section of the guide rail is closer to an internal wall at the end of the push handle to define a tapered internal wall with an expanded bottom opening of the vertical section.

4. The blender lid safety protection device of claim 1, wherein the link rod disposed on the external side of the mixing cup includes a protective cover installed on the external side for covering the link rod between the protective cover and the mixing cup, and restricting the link rod to be displaced linearly up and down only.

* * * * *